United States Patent
Fader

(10) Patent No.: US 8,322,642 B2
(45) Date of Patent: Dec. 4, 2012

(54) ARRANGEMENT FOR CLASSIFYING PARTICLES IN A PYROLYSED CHAR

(76) Inventor: John H. Fader, West Bloomfield, MI (US)

(*) Notice: Subject to any disclaimer, the term of this patent is extended or adjusted under 35 U.S.C. 154(b) by 254 days.

(21) Appl. No.: 12/734,086

(22) PCT Filed: Oct. 9, 2008

(86) PCT No.: PCT/US2008/011615
§ 371 (c)(1),
(2), (4) Date: Apr. 9, 2010

(87) PCT Pub. No.: WO2009/048592
PCT Pub. Date: Apr. 16, 2009

(65) Prior Publication Data
US 2010/0206968 A1    Aug. 19, 2010

Related U.S. Application Data

(60) Provisional application No. 60/998,197, filed on Oct. 9, 2007, provisional application No. 60/986,126, filed on Nov. 7, 2007, provisional application No. 60/986,318, filed on Nov. 8, 2007, provisional application No. 60/986,369, filed on Nov. 8, 2007.

(51) Int. Cl.
*B02C 19/00* (2006.01)
(52) U.S. Cl. .............. 241/39; 241/62; 241/79.1; 241/81
(58) Field of Classification Search .......... 241/5, 19, 241/39, 79.1, 62, 81
See application file for complete search history.

(56) References Cited

U.S. PATENT DOCUMENTS

| | | | |
|---|---|---|---|
| 2,958,472 A | 11/1960 | Erickson et al. | |
| 3,769,257 A | 10/1973 | Porter et al. | |
| 4,221,608 A | 9/1980 | Beckman | |
| 5,389,691 A | 2/1995 | Cha et al. | |
| 2002/0189494 A1 | 12/2002 | Jones, IV et al. | |
| 2005/0023124 A1 | 2/2005 | Karpetsky et al. | |
| 2005/0222317 A1 | 10/2005 | Yatsuyanagi et al. | |

FOREIGN PATENT DOCUMENTS

| | | |
|---|---|---|
| DE | 25 10 297 | 9/1976 |
| EP | 0 211 117 A2 | 2/1987 |
| EP | 0 698 642 A1 | 2/1996 |
| EP | 1 548 509 | 6/2005 |

(Continued)

OTHER PUBLICATIONS

Heinisch, K.; "Kautschuk-Lexikon, 2. Auflage"; 1977, pp. 432-437; Genter Verlag; Stuttgart; XP002512108.

(Continued)

*Primary Examiner* — Mark Rosenbaum
(74) *Attorney, Agent, or Firm* — Warn Partners, P.C.

(57) ABSTRACT

An identification and separation arrangement for forming various mixtures of agglomerates from pyrolized reclaimed carbonaceous materials. The identification and separation arrangement uses a dry air source (28) and a source (16) of reclaimed carbonaceous materials containing small agglomerates and large agglomerates. The reclaimed carbonaceous materials are mixed with the dry air source, pressurized and then introduced to a pulverizer mill (12). The pulverizer mill (12) performs a first round of identification and separation by dividing the reclaimed carbonaceous material into small agglomerates and large agglomerates. The pulverizer mill (12) further fractionates the large agglomerates to form more small agglomerates. The small agglomerates are then moved to a classifier (14) that performs a second round of identification and separation. The classifier (14) separates the small agglomerates into coarse agglomerates and fine agglomerates.

20 Claims, 2 Drawing Sheets

FOREIGN PATENT DOCUMENTS

| | | |
|---|---|---|
| GB | 659683 | 10/1951 |
| JP | 01 317555 A | 12/1989 |
| WO | WO 87/03220 | 6/1987 |
| WO | WO 00/14162 | 3/2000 |
| WO | WO 03/018855 A2 | 3/2003 |

OTHER PUBLICATIONS

"Rubber, Natural and Synthetic-General Test Methods; Carbon Black"; 1991 Annual Book of ASTM Standards, section 9; p. 317; Jan. 1, 1991; vol. 09.01; Philadelphia, Pennsylvania, USA.

Park, T. & Lovell, C.; "Using Pyrolized Carbon Black (PCB) from Waste Tires in Asphalt Pavement" Part 1, Limestone Aggregate from Civil Engineering Joint Transportation Research Program; Feb. 20, 1996; pp. 1-355; Purdue e-Pubs; http://docs.lib.purdue.edu/jtrp/222; West Lafayette, Indiana, USA.

Zeng, Y. & Lovell, C.; "Using Pyrolized Carbon Black (PCB) from Waste Tires in Asphalt Pavement" Part 2, Asphalt Binder from Civil Engineering Joint Transportation Research Program; Feb. 20, 1996; pp. 1-155; Purdue e-Pubs; http://docs.lib.purdue.edu/jtrp/223; West Lafayette, Indiana, USA.

Rostler, F.S., White, R.M. & Dannenberg, E.M.; "Carbon Black as a Reinforcing Agent for Asphalt"; Proceedings of the Association of Asphalt Paving Technologies (AAPT); 1977; pp. 376-401; vol. 46; XP009114874.

Park, T., Coree, B.J. & Lovell, C.W.; "Evaluation of Pyrolized Carbon Black from Scrap Tires as Additive in Hot Mix Asphalt"; Transportation Research Record; Jan. 1, 1996; pp. 43-55; Transportation Research Board, Washington; ISSN: 0361-1981.

ARRANGEMENT FOR CLASSIFYING PARTICLES IN A PYROLYSED CHAR

CROSS-REFERENCE TO RELATED APPLICATIONS

This application is a National Stage of International Application No. PCT/US2008/011615, filed Oct. 9, 2008. This application claims the benefit of the following applications:

U.S. Provisional Application No. 60/986,126, filed Nov. 7, 2007.

U.S. Provisional Application No. 60/998,197 filed Oct. 9, 2007.

U.S. Provisional Application No. 60/986,318 filed Nov. 8, 2007.

U.S. Provisional Application No. 60/986,369 filed Nov. 8, 2007.

The disclosures of the above applications are incorporated herein by reference.

FIELD OF THE INVENTION

The present invention relates to an arrangement for identifying and separating a mixture of carbon black or other carbonaceous materials into different qualities.

BACKGROUND OF THE INVENTION

There have been many attempts to recycle tires and other rubber products to reclaim usable hydrocarbons through the use of a process called pyrolysis. Through pyrolysis, tires have been processed to produce fuel and other hydrocarbon compounds. One particular byproduct resulting from the pyrolysis process is an ash or char material which is leftover after the process is complete. Attempts have been made to use this char as a low grade carbon black for use as a type of filler. However, this has been met with several disadvantages, most significantly the disadvantage of the impurities in the char resulting from the random distribution of particle size of the char itself. It has been found that a composition of raw char has large particles or large agglomerates, and small particles or small agglomerates. However, some applications for using carbon black as a filler compound require that the carbon black mixture consists of primarily small agglomerates which create a "fluffy" carbon black mixture suitable for use as a filler for rubber in plastics.

There have been attempts to create "fluffy" carbon black by using grinders that crush the mixture of reclaimed carbonaceous materials into small particles or agglomerates. However, these attempts have not always produced a mixture with consistent agglomerate size and such mixtures often have an unfavorable nitrogen surface area of the agglomerate particles. Thus, there exists a need to fractionate samples carbon black containing agglomerates into mixtures having consistent particle size and different grades or classifications based on particle size and other factors.

Accordingly there exists a need to improve the identification and separation of carbon black containing agglomerates into mixtures having smaller more consistent agglomerate sizes and better physical properties such as a high nitrogen surface area value.

SUMMARY OF THE INVENTION

The present invention relates to an identification and separation arrangement for forming various qualities of agglomerate mixtures from pyrolized polymeric materials. The pyrolized reclaimed carbonaceous materials are derived from used tires, automotive shredder residue and virtually any type of used polymer. After the step of pyrolysis has occurred the identification and separation arrangement is used. The identification and separation arrangement uses a dry air source and a source of reclaimed carbonaceous materials containing small agglomerates and large agglomerates. The reclaimed carbonaceous materials are mixed with the dry air source, pressurized and then introduced to a pulverizer mill. The pulverizer mill performs a first round of identification and separation by dividing the reclaimed carbonaceous material into small agglomerates and large agglomerates. The pulverizer mill further fractionates the large agglomerates to form more small agglomerates. The small agglomerates are then moved to a classifier that performs a second round of identification and separation. The classifier separates the small agglomerates into coarse agglomerates and fine agglomerates.

The reclaimed carbonaceous material discussed below is a mixture of elements including carbon black and inorganic functional fillers that have clustered together for form agglomerates of various sizes. The present invention seeks to separate the reclaimed carbonaceous materials into different classes of filler material having different particle sizes and surface chemistries. The present invention also achieves the goal of fractionating large agglomerates into smaller agglomerates that are more useful filler materials.

The large agglomerates discussed below include clusters of agglomerates that are between about 1 micron and about 100 microns in size, while the small agglomerates exiting the pulverizer mill are agglomerates between generally about 1 micron and about 45 microns in size. The coarse agglomerates mixture that are obtained from the classifier have agglomerates that are generally about 10 microns to about 20 microns in size, have a greater density, and are suitable to use as filler materials where a lower grade of carbon black can be used. The fine agglomerates mixture are a filler material having agglomerates of low density and are generally about 10 nm to about 35 nm in size. These fine agglomerates are suitable fillers where high grade carbon black particles are needed that are equivalent to virgin carbon black fillers.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
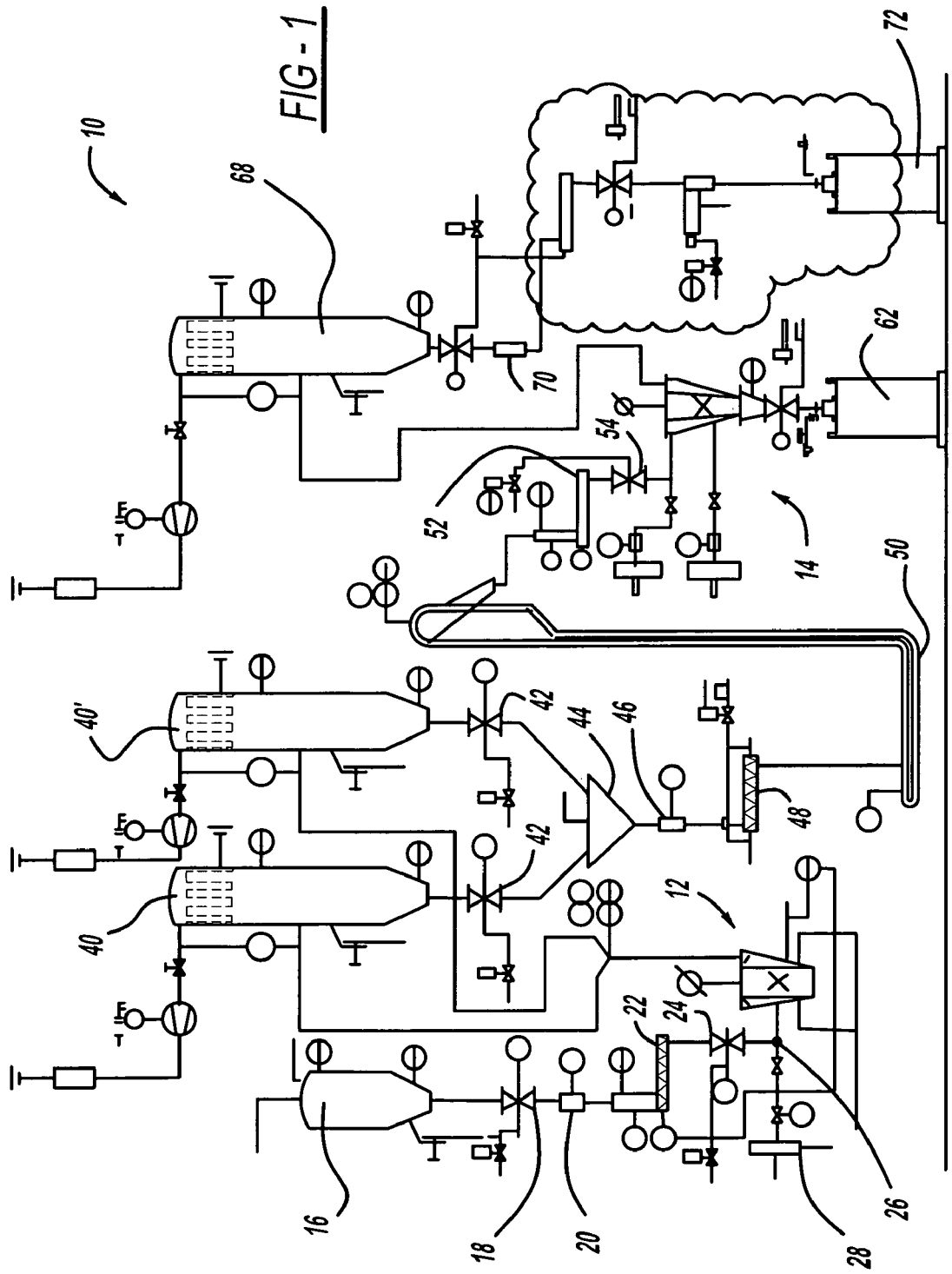
FIG. 1 is a schematic view of the identification arrangement in accordance with the present invention.

FIG. 1 depicts a schematic view of the identification and separation arrangement 10 in accordance with the present invention. Referring now to all of the figures and FIG. 1 in particular, the arrangement 10 includes a pulverizer mill 12 and a classifier 14. A hopper 16 serves as a source for the reclaimed carbonaceous materials to the arrangement 10. The hopper 16 is used to collect reclaimed carbonaceous materials prepared from the pyrolysis of recycled polymeric materials, such as but not limited to scrap tires, polymeric automotive components, used rubber materials, and plastic containers or the like. The reclaimed carbonaceous materials consist of large agglomerates, and small agglomerates of carbon black and other materials. While a collection hopper 16 is used to hold the reclaimed carbonaceous materials it is possible for the reclaimed carbonaceous materials to be fed directly into the arrangement 10 from a pyrolysis reactor (not shown) without first being collected in the hopper 16.

A valve 18 controls the flow of reclaimed carbonaceous materials from the hopper 16 to a magnet separator 20. The reclaimed carbonaceous materials sometimes have metal particles that were present in the recycled polymeric material prior to pyrolysis. These metal particles can harm the pulverizer mill 12 and the magnet separator 20 removes these unwanted metal particles. The use of the magnet separator 20 is not required and a greater or lesser number of magnet separators can be used.

After passing through the magnet separator 20 the reclaimed carbonaceous material is presented to a screw 22 that rotates and controls the flow of the material to the pulverizer mill 12. A valve 24 is used to turn on and off the flow of reclaimed carbonaceous material to a mixing node 26. At the mixing node 26 the reclaimed carbonaceous material is mixed with dry, filtered high pressure air generated from an air source 28. Together the mixture of dry pressurized air and reclaimed carbonaceous material are a feed that is introduced through a feed inlet 30 (see FIG. 2) of the pulverizer mill 12.

Figure 2:
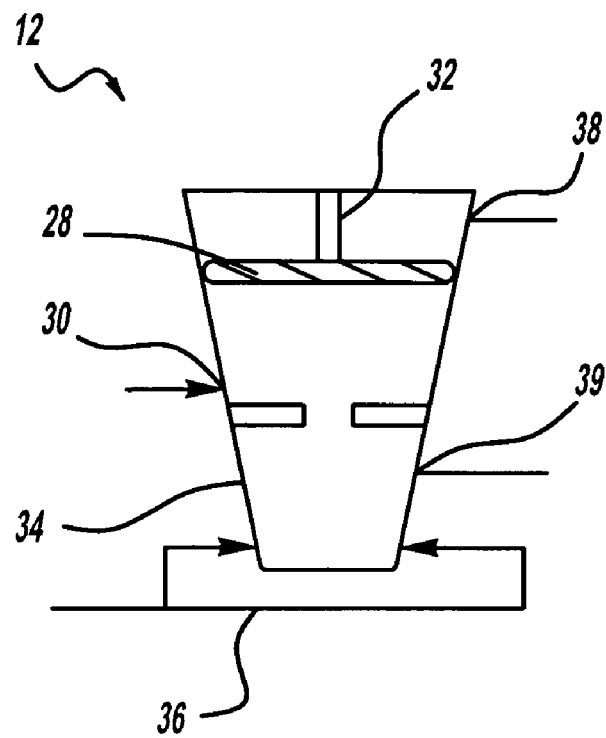
FIG. 2 is a cross sectional plan schematic view of the pulverizer mill and the flow of carbon black through it in accordance with the present invention.

FIG. 2. depicts a schematic diagram of the pulverizer mill 12 which has a vortex column 28 where pressurized feed is introduced through the feed inlet 30 and swirls around the vortex column 28 causing the small agglomerates present in the feed to move to the top of the vortex column 28 while the larger agglomerates fall downward. While a single feed inlet 30 is described it is possible to have a greater number of feed inlets to adjust or enhance the swirling in the vortex column 28. A classifying disk 32 is present in the vortex column 28 and contributes to the swirling of the feed and prevents large agglomerates from moving past the classifying disk 22. The classifying disk 32 swirls the agglomerates and air in the vortex column 28 and uses specific gravity to separate the heavy dense agglomerates and particles from the lighter less dense agglomerates and particles. Thus the heavy dense agglomerates settle to the bottom of the vortex column 28, while the less dense agglomerates move to the top of the vortex column 28.

As the larger agglomerates move to the bottom of the vortex, they enter a fractionation chamber 34 of the pulverizer mill 12. At least two opposing air inlets 36 are present in the fractionation chamber 34 for blowing the large agglomerate particles at opposite sides of the chamber toward each other. While two opposing air inlets 36 are discussed it is possible to have a greater or lesser number of opposing air inlets 36. The large agglomerate particles are accelerated toward each other, collide and are fractionated into smaller agglomerates. The smaller agglomerates are reintroduced into the vortex column 28 where they go past the classification disk 32 if their density is low enough, and then travel out of a small agglomerates port 38. The larger agglomerates that do not get fractionated exit a chamber outlet 38 and are collected. Optionally the large agglomerates that leave via the chamber outlet 38 can be reintroduced to the reclaimed carbonaceous material at the valve 24.

The small agglomerates that pass through the small agglomerates port 38 flow on to one of two filter hoppers 40, 40'. The filter hoppers contain a polymer surface area filter that collects the small agglomerates which have a tendency to become airborne after leaving the vortex column 28. The present invention describes using two filter hoppers for collecting the small agglomerates, however, it is within the scope of this invention for a greater or lesser number of filter hoppers to be used depending upon the rate of production from the pulverizer mill 12. Valves 42, 42' control the flow of small agglomerates from the filter hoppers 40, 40' onto a small agglomerate supply hopper 44 that is used to supply small agglomerates to the classifier 14. While FIG. 1 depicts multiple valves 42, 42' associated the filter hoppers 40, 40' it is possible to have a greater or lesser number of valves. After leaving the small agglomerate supply hopper 44 the small agglomerates are optionally passed through a second magnet filter 46 to further remove any metallic impurities present. A feed screw 48 receives the small agglomerates and controls the flow of small agglomerates supplied to a conveyor 50 that moves the small agglomerates to another feed screw 52 and valve 54 that control the flow of the small agglomerates to the classifier 14. It is with the scope of this invention to have the feed screw 48 flow directly to the classifier 14, however, it is preferable to use multiple feed screws and the conveyor because of the physical size of the components in the identification and separation arrangement 10 requires moving the small agglomerates a distance between components.

Figure 3:
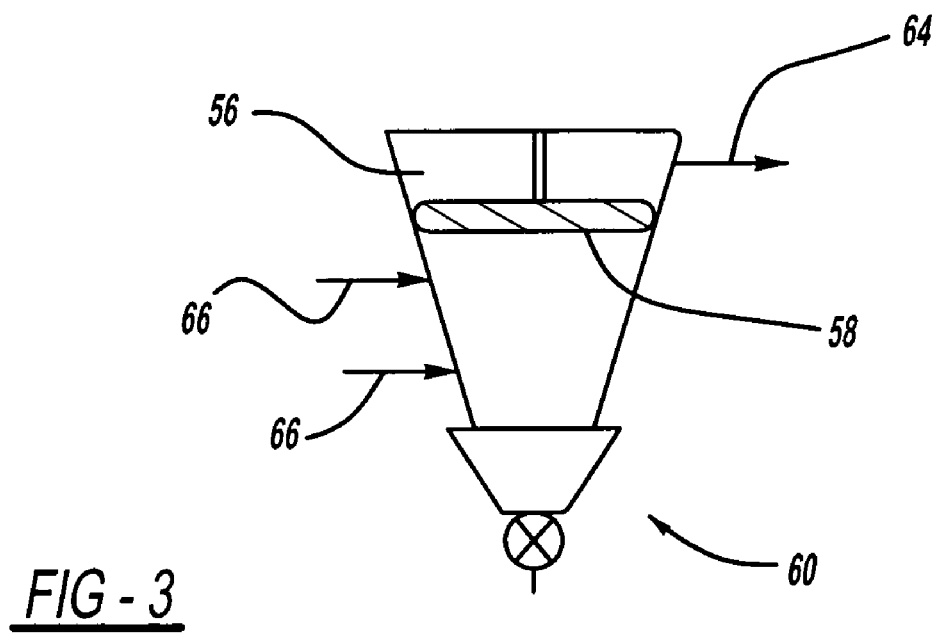
FIG. 3 is a cross sectional plan schematic view of the classifier in accordance with the present invention.

Referring now to FIGS. 1 and 3 the small agglomerates enter the classifier 14 through the one of two high pressure inlets 66. The small agglomerates are mixed with dry pressurized air, fed through one of the two inlets 66 and are swirled in a vortex column 56 of the classifier 14 where the small agglomerates are separated into a coarse agglomerates mixture and a fine agglomerates mixture. Some of the small agglomerates are made of coarse agglomerates with fine agglomerates stuck to the coarse agglomerates. The swirling of the small agglomerates causes the fine agglomerates which have a low density and are sized in the nanometer range to separate from the coarse agglomerate particles which are much denser and are measured in microns. The swirling action in the vortex column 56 is caused by the air pressure flowing through the high pressure inlets 66 and a rotary classification wheel 58 which causes the fine agglomerates which are less dense and have a smaller particle size to move to the top of the vortex column 56. The coarse agglomerates which are denser and generally larger in size than the small agglomerates move to the bottom of the vortex column. It is within the scope of this invention to have a greater or lesser number of air inlets 66 as well as having the small agglomerates enter the vortex column 56 through more than one of the high pressure inlets 66.

The rotary classification wheel 58 functions in the same way as the classification disk 32 of the pulverizer mill 12 by only allowing agglomerates of a certain size and density to pass out of the vortex column 58 through a fine agglomerates outlet 64. The coarse agglomerates settle to the bottom of the vortex column 56 and are collected in a container 62 for use as a filler in processes where coarse agglomerates are acceptable. The fine agglomerates that pass through the fine agglomerates outlet 64 flow to a filter hopper 68 containing a polymeric surface area filter that collects the fine agglomerates. This step is necessary because the fine agglomerates are so small in size that they become easily airborne. After passing through the filter hopper 68 the fine agglomerates are then optionally passed through a magnet separator 70 to remove any metallic impurities that might be present and then the fine agglomerates are moved to a holding area 72 where they form a fine agglomerates mixture that is stored in a container, pelletizer, bag or blended with an elastomer to prevent the fine agglomerates from becoming airborne. The fine agglomerates mixture and coarse agglomerates mixture contain high amounts of carbon black and are useful filler materials that are comparable to virgin carbon blacks.

Additional information and examples of the materials used in accordance with the present invention can be found in the following applications: U.S. patent application No. 60/998,197 entitled "Elastomer Composition with Reclaimed Filler Material," Filed Oct. 9, 2007, application No. 60/986,318 entitled "Process For Classifying Particles In A Pyrolysed Char," filed Nov. 8, 2007, application No. 60/986,369 entitled "Asphalt Composition Using Pyrolysed Carbonaceous Materials," filed Nov. 8, 2007, and application No. 60/986,126 entitled "Enhanced Fine Agglomerate Mixture," filed Nov. 7, 2007, wherein the entirety of each application is hereby incorporated by reference.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. An identification and separation arrangement forming mixtures of agglomerates formed from reclaimed carbonaceous materials:
   reclaimed carbonaceous materials prepared from recycled polymeric materials, said reclaimed carbonaceous materials include large agglomerates, small agglomerates, functional filler materials and metal particle contaminants, wherein said reclaimed carbonaceous materials are contained in a source;
   a dry air source wherein said reclaimed carbonaceous materials are mixed with said dry air source and pressurized;
   a pulverizer mill for receiving said pressurized dry air and said reclaimed carbonaceous materials wherein said pulverizer mill separates the small agglomerates from the large agglomerates and fractionates the large agglomerates to form more small agglomerates;
   a magnet separator connected between said source and said pulverizer mill, wherein said magnet separator removes said metal particle contaminants from said reclaimed carbonaceous filler materials prior to entering said pulverizer mill; and
   a classifier operably configured to receive said small agglomerates from said pulverizer mill and separating said small agglomerates into fine agglomerates and coarse agglomerates.

2. The identification and separation arrangement of claim 1 further comprising one or more filter hoppers connected between said pulverizer mill and said classifier for collecting and filtering said small agglomerates prior to entering said classifier.

3. The identification and separation arrangement of claim 1 further comprising a magnet separator connected between said pulverizer mill and said classifier, wherein said magnet separator removes metals from said small agglomerates prior to entering said classifier.

4. The identification and separation arrangement of claim 1 wherein said classifier includes a vortex column with at least two air inlets for receiving a mixture of dry air and said small agglomerates to cause said small agglomerates to swirl and separate into coarse agglomerates and fine agglomerates.

5. The identification and separation arrangement of claim 4 wherein said vortex column of said classifier further includes a rotary classification wheel for causing said large agglomerates and said small agglomerates to swirl and separate.

6. The identification and separation arrangement of claim 1 wherein said pulverizer mill further comprises:
   a vortex column for receiving said pressurized air and said reclaimed carbonaceous materials and swirling them to separate into large agglomerate and small agglomerates;
   a fractionating chamber for receiving said large agglomerates and fractionating them into more small agglomerates that are then reintroduced into the said vortex of said pulverizer.

7. The identification and separation apparatus arrangement of claim 1 wherein said classifier further comprises a coarse agglomerates outlet for removing said coarse agglomerates from said classifier and a fine agglomerates outlet for removing said fine agglomerates from said classifier and sending them to a filter hopper wherein said fine agglomerates are collected from the high pressure air mixture and form a fine agglomerates mixture.

8. An identification and separation arrangement for forming mixtures of agglomerates formed from reclaimed carbonaceous materials comprising:
   reclaimed carbonaceous materials prepared from recycled polymeric materials, said reclaimed carbonaceous materials include large agglomerates, small agglomerates, functional filler materials and metal particle contaminants, wherein said reclaimed carbonaceous materials are contained in a source;
   a pulverizer mill;
   a vortex portion of said pulverizer mill having at least one feed inlet;
   a dry air source wherein said reclaimed carbonaceous materials are mixed with said dry air source and pressurized to flow though said at least one feed inlet to cause said reclaimed carbonaceous materials to swirl and separate the large agglomerates and small agglomerates;
   a fractionating chamber of said pulverizer mill operably connected to said vortex portion for receiving said larger agglomerates of said reclaimed carbonaceous materials;
   at least two opposing air inlets connected to said fractionating chamber such that said larger agglomerates are caused to collide and fractionate in said pulverizer chamber to form more smaller agglomerates which are introduced to said vortex portion of said pulverizer mill;
   a pulverizer mill outlet connected to said vortex column of said pulverizer mill for removing small agglomerates;
   a magnet separator connected between said source and said pulverizer mill, wherein said magnet separator removes said metal particle contaminants from said reclaimed carbonaceous filler materials prior to entering said pulverizer mill; and
   a classifier for receiving said small agglomerates and further separating said small agglomerates into fine agglomerates and coarse agglomerates.

9. The identification and separation arrangement of claim 8 further comprising one or more filter hoppers connected between said pulverizer mill and said classifier for collecting and filtering said small agglomerates prior to entering said classifier.

10. The identification and separation arrangement of claim 8 further comprising a magnet separator connected between said pulverizer mill and said classifier, wherein said magnet separator removes metals from said small agglomerates prior to entering said classifier.

11. The identification and separation arrangement of claim 8 wherein said classifier includes a vortex column with at least two air inlets for receiving a mixture of dry air and said small agglomerates to cause said small agglomerates to swirl and separate into coarse agglomerates and fine agglomerates.

12. The identification and separation arrangement of claim 11 wherein said vortex column of said pulverizer mill further includes a rotary classification wheel assisting in the swirling of and separation of said coarse agglomerates and fine agglomerates.

13. The identification and separation arrangement of claim 11 wherein said vortex column of said classifier further includes a rotary classification wheel for causing said large agglomerates and said small agglomerates to swirl and separate.

14. The identification and separation apparatus arrangement of claim 8 wherein said classifier further comprises a coarse agglomerates outlet for removing said coarse agglomerates from said classifier and a fine agglomerates outlet for removing said fine agglomerates from said classifier and sending them to a filter hopper wherein said fine agglomerates are collected from the high pressure air mixture and form a fine agglomerates mixture.

15. An identification and separation arrangement forming mixtures of agglomerates formed from reclaimed carbonaceous materials comprising:
  reclaimed carbonaceous materials prepared from recycled polymeric materials, said reclaimed carbonaceous materials include large agglomerates, small agglomerates, functional filler materials and metal particle contaminants, wherein said reclaimed carbonaceous materials are contained in a source;
  a dry air source wherein said reclaimed carbonaceous materials are mixed with said dry air source and pressurized;
  a pulverizer mill for receiving said pressurized dry air and said reclaimed carbonaceous materials wherein said pulverizer mill separates the small agglomerates from the large agglomerates and fractionates the large agglomerates to form more small agglomerates;
  a magnet separator connected between said source and said pulverizer mill, wherein said magnet separator removes said metal particle contaminants from said reclaimed carbonaceous filler materials prior to entering said pulverizer mill;
  a classifier having a vortex column, said classifier operably configured to receive said small agglomerates from said pulverizer mill and separating said small agglomerates into fine agglomerates and coarse agglomerates; and
  one or more air inlets connected to said vortex column for supplying high pressure air to said vortex column and causing said small agglomerates to swirl and separate into fine agglomerates and coarse agglomerates.

16. The identification and separation arrangement of claim 15 further comprising one or more filter hoppers connected between said pulverizer mill and said classifier for collecting and filtering said small agglomerates prior to entering said classifier.

17. The identification and separation arrangement of claim 15 further comprising a magnet separator connected between said pulverizer mill and said classifier, wherein said magnet separator removes metals from said small agglomerates prior to entering said classifier.

18. The identification and separation arrangement of claim 15 wherein said vortex column of said pulverizer mill further includes a rotary classification wheel assisting in the swirling of and separation of said coarse agglomerates and fine agglomerates.

19. The identification and separation arrangement of claim 15 wherein said vortex column of said classifier further includes a rotary classification wheel for causing said large agglomerates and said small agglomerates to swirl and separate.

20. The identification and separation apparatus arrangement of claim 19 wherein said classifier further comprises a coarse agglomerates outlet for removing said coarse agglomerates from said classifier and a fine agglomerates outlet for removing said fine agglomerates from said classifier and sending them to a filter hopper wherein said fine agglomerates are collected from the high pressure air mixture and form a fine agglomerates mixture.

* * * * *